April 23, 1935.  C. W. LEGUILLON  1,998,814
APPARATUS FOR MAKING STRIP MATERIAL
Filed March 14, 1932  3 Sheets-Sheet 1
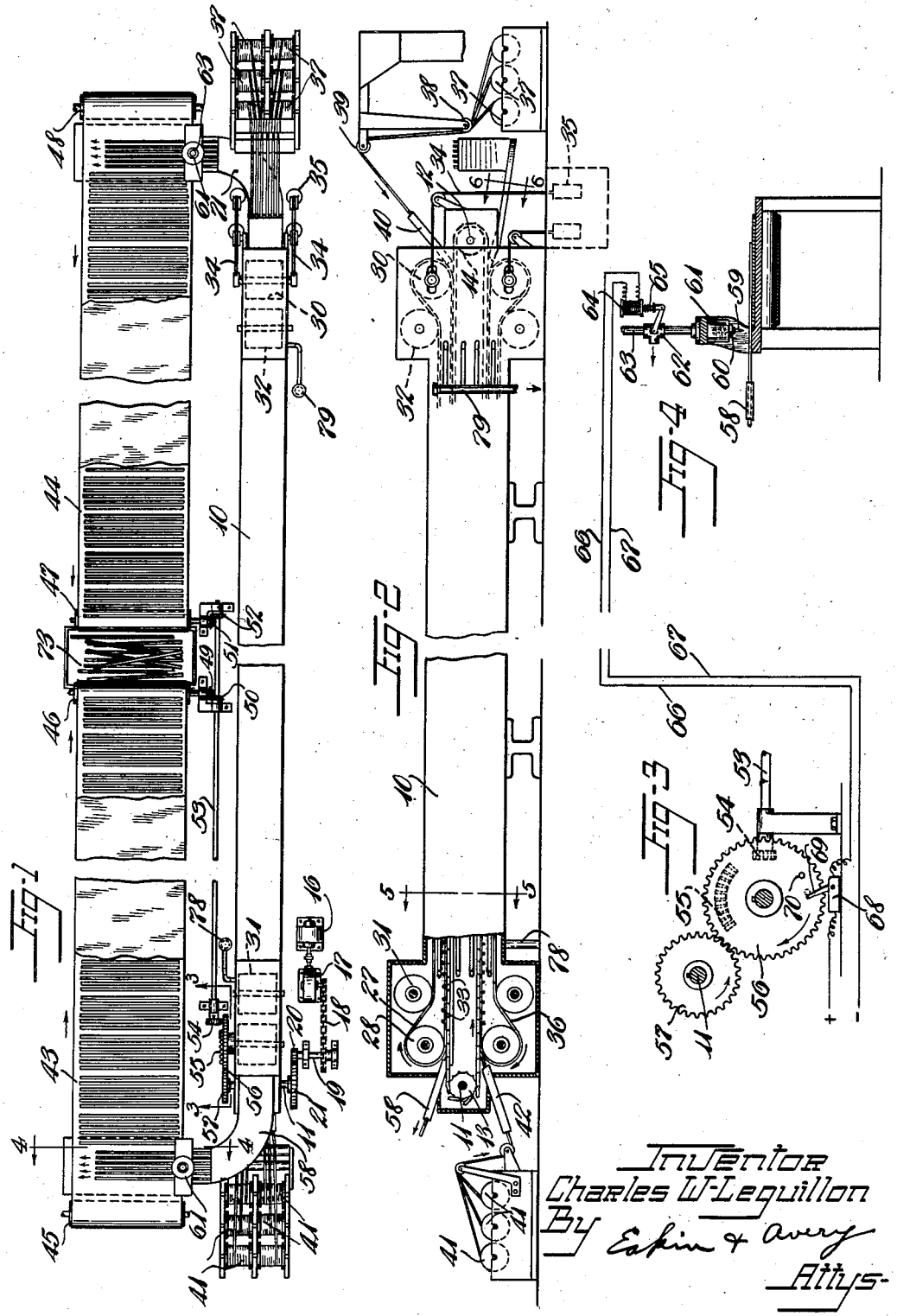
Inventor
Charles W. Leguillon
By Eakin & Avery
Attys-

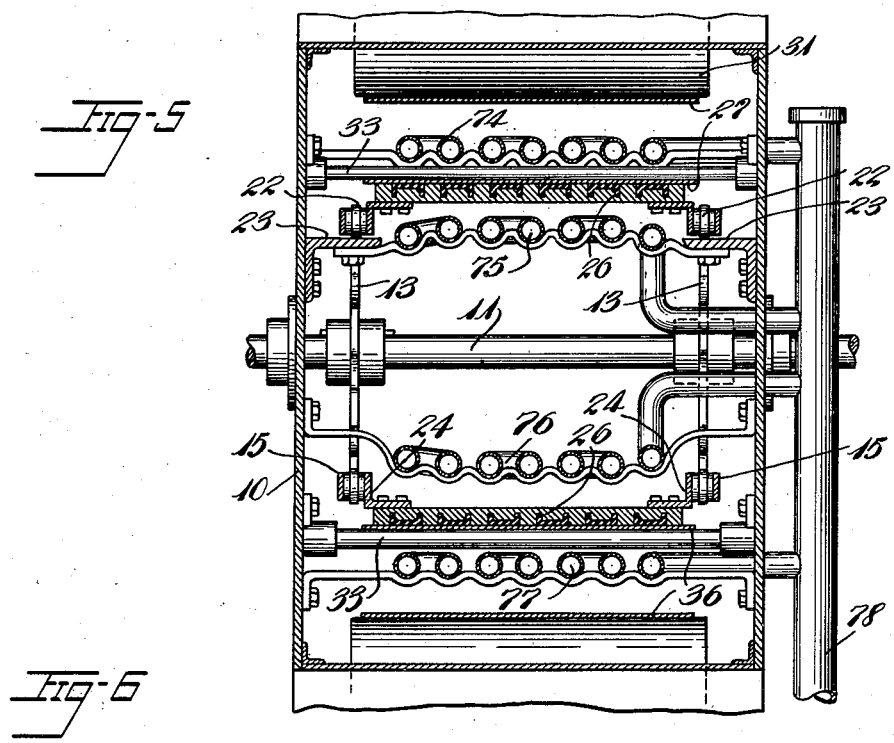
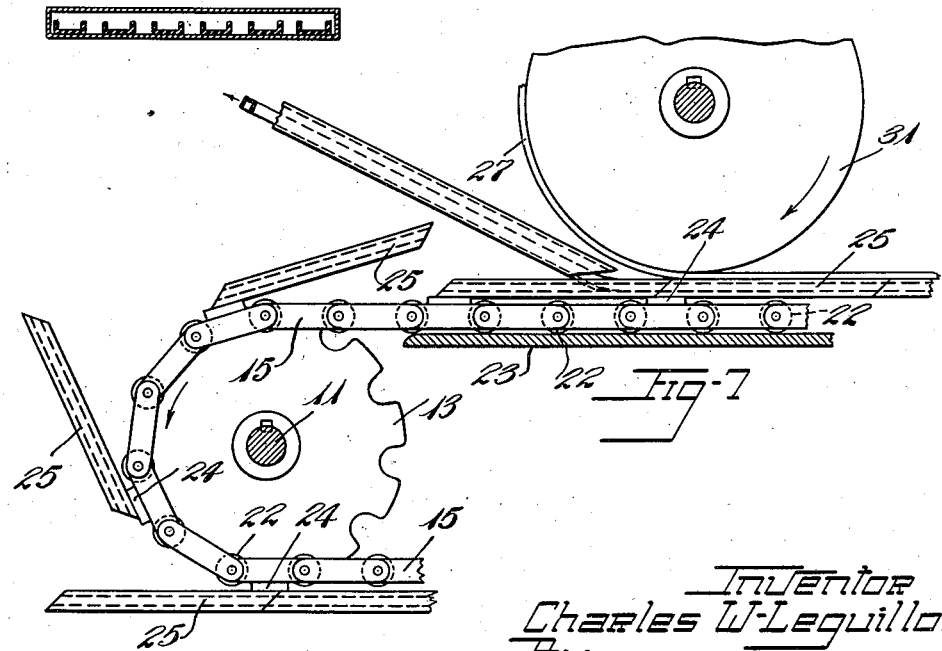

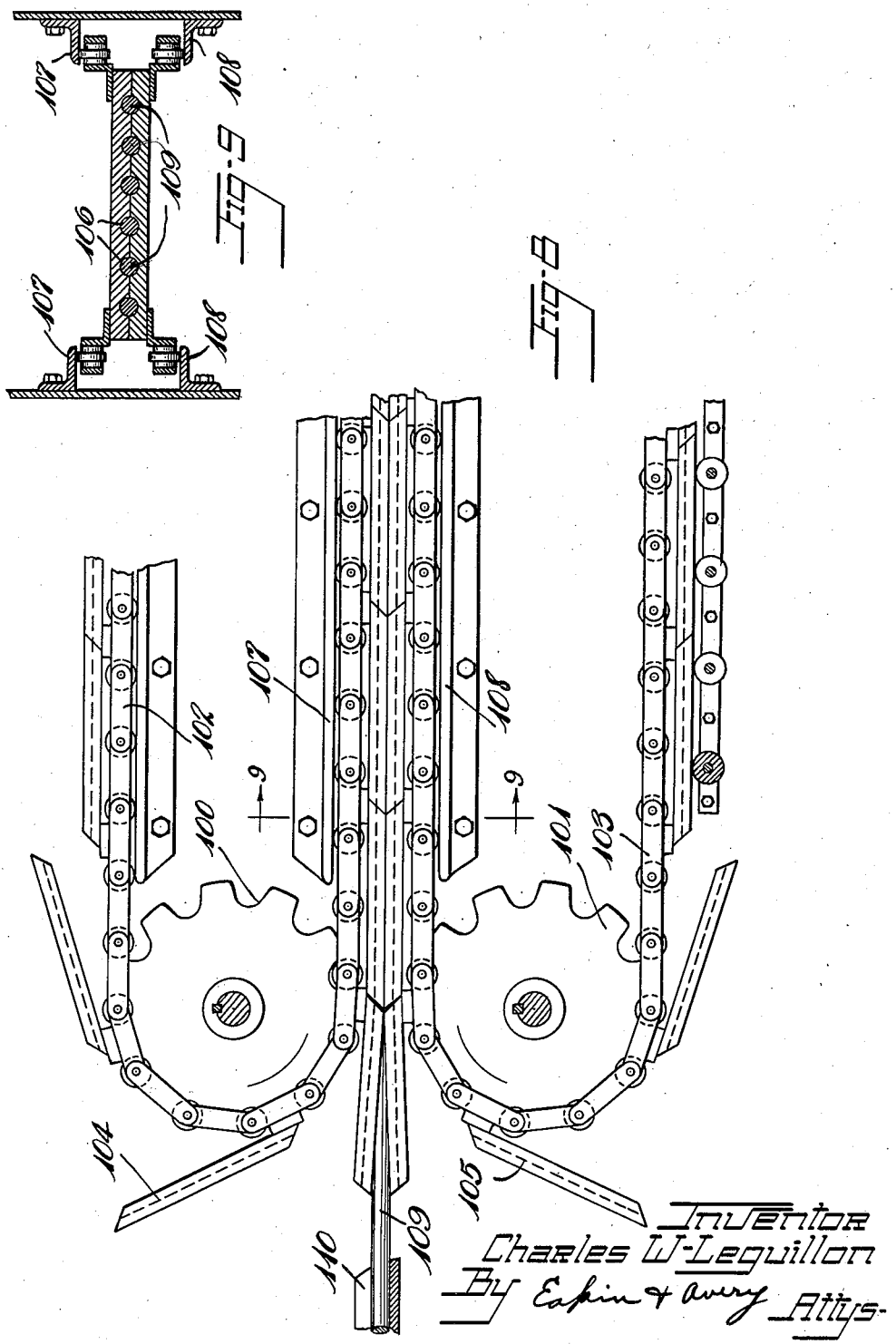

Patented Apr. 23, 1935

1,998,814

UNITED STATES PATENT OFFICE 1,998,814

APPARATUS FOR MAKING STRIP MATERIAL

Charles W. Leguillon, Akron, Ohio, assignor to The B. F. Goodrich Company, New York, N. Y., a corporation of New York Application March 14, 1932, Serial No. 598,606

2 Claims. (Cl. 18—6)

This invention relates to a method and apparatus for making strip material and is especially adapted to the vulcanizing of strip material and the cutting of the vulcanized material to length. The invention is particularly useful in the manufacture of channel strips for cushioning the glass of automobiles.

The principal objects of the invention are to provide efficiency and uniformity in the manufacture of strip material.

Other objects will appear from the following description and the accompanying drawings.

In the drawings:

Fig. 1 is a plan view of the apparatus.

Fig. 2 is a side elevation of the same, part of the device being broken away and shown in section.

Fig. 3 is a detail view of the cut-timing mechanism, being taken on line 3—3 of Fig. 1.

Fig. 4 is a detail sectional view showing the cutting mechanism and taken on line 4—4 of Fig. 1.

Fig. 5 is a sectional view of the vulcanizing mechanism taken on line 5—5 of Fig. 2.

Fig. 6 is a sectional view of the delivery guide and the strips therein, taken on line 6—6 of Fig. 2.

Fig. 7 is a detail view of the molding members and guiding members on an enlarged scale.

Fig. 8 is a view similar to Fig. 7, showing a modified form of apparatus.

Fig. 9 is a cross section on line 9—9 of Fig. 8.

Referring to the drawings, the numeral 10 designates a vulcanizing chamber which is completely closed except for openings hereinafter described. A pair of horizontal shafts 11, 12 extend laterally through the chamber near opposite ends thereof, bearings being provided in the side walls of the chamber for supporting the shafts.

Shaft 11 is provided with sprockets 13, 13 fixed thereto and a similar set of sprockets 14 are attached to shaft 12 in alignment therewith. Each pair of sprockets is surrounded by a chain 15, 15 the reaches of which extend therebetween lengthwise of the chamber.

An electric motor 16 is provided for driving the chains through a speed reducer 17, a chain 18, and a countershaft 19, which carries a pinion 20 which meshes with a gear 21 on shaft 11.

Chains 15, 15 are provided with rollers 22 which engage tracks 23, 23 supported by the side walls of the chamber. Each chain is provided at spaced intervals with links which support angle brackets 24, 24 to which are fixed mold sections 25, the arrangement being such that the ends of successive mold members abut when in a straight reach of the chains. These mold sections are preferably provided with inclined meeting surfaces as shown in Fig. 7 and are fixed to the chains only at one extremity. The faces of the mold sections are grooved as at 26 to provide strip molding cavities corresponding in shape to the article to be vulcanized and which, when the mold sections are in a straight reach of the chains form continuous cavities for reception of continuous strips of material. The mold sections are preferably made long enough to span several links of a chain so as to reduce the number of joints therebetween.

An endless band of metal 27 is supported and driven by a pulley 28 mounted on a shaft 29 extending through the cabinet near shaft 11 and driven thereby. Band 27 also surrounds a pulley 30 and is directed in its course by idler pulleys 31 and 32 and a series of closely spaced rollers 33 so that it closes the cavities 26 of mold sections 25 throughout the upper reaches of the chains 15, 15. Pulley 30 is adjustable so as to tension the metal band and for this purpose is connected by a cable 34 to a tension weight 35.

A similar metal band 36 is similarly driven and directed in contact with the lower reach of the mold sections. The cavities formed by the band 27 and the upper reach of the mold sections are supplied by strip material from supply spools 37, 37, 37, the material passing over suitable guide rollers 38 and 39 and through a guide-way 40 extending through the walls of the chamber.

The cavities formed by the band 36 and the lower reaches of the mold sections are similarly supplied from spools 41, 41, 41 through a guide-way 42.

Disposed along the vulcanizing chamber at one side thereof are conveyor belts 43 and 44 whose upper reaches are driven toward each other. Conveyor belt 43 is mounted on pulleys 45 and 46 and conveyor belt 44 is mounted on pulleys 47 and 48. Pulleys 46 and 47 are driven by bevel gears 49, 50, 51 and 52 from a shaft 53, the arrangement being such that the upper reaches of the conveyors travel toward each other. A pinion 54 fastened on shaft 53 is intermittently driven by a toothed sector 55 mounted on a gear 56. Gear 56 is mounted on the shaft of one of the band driving pulleys and is driven by a gear 57 mounted on shaft 11.

As the vulcanized strips leave the upper reach of the molding chain they are guided by a guide 58 and directed transverse to conveyor belt 43 as indicated in Fig. 1. A knife blade 59 is mounted above the course of the strips adjacent conveyor 43 and is adapted to be propelled downwardly to cut lengths from the advanced strips. For this purpose the knife 59 is mounted upon a movable piston 60 located in an air cylinder 61 supplied by compressed air or other fluid under pressure through a two way valve 62 from a supply pipe 63. The valve is operated by a solenoid 64 which when energized attracts an armature 65 connected to the valve.

Current to supply the solenoid is supplied through wires 66 and 67 from any source (not shown). A switch 68 has an operating lever 69 located in the path of a pin 70 on gear 56 and is adapted to close the circuit through the solenoid 64 when the pin 70 contacts with the operating lever 69. As the vulcanized strips leave the lower reach of the molding chain they are guided through a delivery guide 71 under a cutter 72 operated from the same switch 68 and in the same manner as knife 59, the operation of the two knives being simultaneous. As the several strips fall on the belts 43 and 44 they are delivered to a container 73.

The vulcanizing chamber may be heated in any desired manner as by steam pipes 74, 75, 76 and 77 located along the reaches of the mold chains and supplied by steam main 78, a return main 79 serving to return the condensed water.

The operation of the device is as follows:

A plurality of rolls 41 of strip material such as assembled rubber and fabric for forming channel strips is fed from spools 41 between the mold members 25 and the band 36. A similar set of strips are fed between the mold members 25 and the band 27 at the opposite end of the chamber. The mold chains and bands are driven continuously and the chamber heated to the proper temperature to complete the desired vulcanization in one passage through the chamber. As the ends of the strips are advanced over the conveyors 43 and 44 they are simultaneously cut and deposited on the conveyors which are stationary at that time because the sector 55 has not engaged the pinion 54 (see Fig. 3). As the pin 70 reaches the dotted line position in Fig. 3 and closes the switch 68 operating the cutters, the sector 55 engages the pinion 54 and advances conveyors 43 and 44 a sufficient distance to present unoccupied portions of the conveyors to the cutters, whereupon the sector 55 leaves the pinion 54 and the conveyors dwell until the proper length of strips of vulcanized material have advanced past the cutters. The strips deposited on the conveyors are delivered to the delivery receptacle 73 by successive movements of the conveyors.

The modified form of apparatus shown in Figs. 8 and 9 is similar to that heretofore described but is adapted to vulcanize strips formed on both sides. In this form of apparatus the endless metal band is replaced by an additional molding chain carrying mold sections similar to those previously described. The numerals 100, 101 designate sprockets adapted to drive the molding chains 102, 103 which carry the mold plates 104, 105. The mold plates are grooved to define cavities 106 therebetween. Guides 107 and 108 are provided to hold the molds in alignment during vulcanization. The strip material is represented by the numeral 109 as being delivered from a guide 110.

I claim:

1. Apparatus for making strip material, said apparatus comprising a chain conveyor composed of articulated links, a plurality of mold sections carried thereby each attached to said conveyor at one end only and of such length as to span a plurality of said links, said sections being adapted to operate to form a continuous molding cavity when in a straight reach of the conveyor.

2. Apparatus for making strip material, said apparatus comprising a chain conveyor composed of articulated links, a plurality of mold sections carried thereby each attached to said conveyor at one end only and of such length as to span a plurality of said links, said sections being adapted to abut each other in a straight reach of the conveyor, a belt cooperating with said mold sections to define a continuous strip molding cavity, and means located along a straight reach of the conveyor to guide said sections and said belt in molding relation.

CHARLES W. LEGUILLON.